US008995289B2

(12) United States Patent
Diab et al.

(10) Patent No.: US 8,995,289 B2
(45) Date of Patent: Mar. 31, 2015

(54) METHOD AND SYSTEM FOR IMPLEMENTING ENERGY EFFICIENT ETHERNET TECHNIQUES IN A MACSEC ENABLED PHY

(75) Inventors: Wael William Diab, San Francisco, CA (US); Nicholas Ilyadis, Merimack, NH (US)

(73) Assignee: Broadcom Corporation, Irvine, CA (US)

( * ) Notice: Subject to any disclaimer, the term of this patent is extended or adjusted under 35 U.S.C. 154(b) by 454 days.

(21) Appl. No.: 12/482,194

(22) Filed: Jun. 10, 2009

(65) Prior Publication Data

US 2010/0229013 A1 Sep. 9, 2010

Related U.S. Application Data

(60) Provisional application No. 61/157,450, filed on Mar. 4, 2009.

(51) Int. Cl.
*G01R 31/08* (2006.01)
*H04J 1/16* (2006.01)
(Continued)

(52) U.S. Cl.
CPC ............... *H04L 63/16* (2013.01); *H04L 12/10* (2013.01)
USPC ............................ 370/252; 709/224; 713/323

(58) Field of Classification Search
CPC ........ Y02B 60/34; Y02B 60/35; Y02B 60/44; Y02B 60/31; H04L 12/40136
USPC .................... 370/419, 252; 713/323; 709/224
See application file for complete search history.

(56) References Cited

U.S. PATENT DOCUMENTS 6,795,450 B1  9/2004  Mills et al.
6,856,597 B1  2/2005  Scott
(Continued)

FOREIGN PATENT DOCUMENTS

EP  1 473 870  11/2004
EP  1 484 876  12/2004
(Continued)

OTHER PUBLICATIONS

Teener, "Audio/Video Bridging for Home Networks (IEEE 802.1 AV Bridging Task Group)" [Online] Jun. 1, 2007, http://www.ieee802. org/3/eee_study/public/jul07/teener_1_0707.pdf.
(Continued)

*Primary Examiner* — Hoang-Chuong Vu
(74) *Attorney, Agent, or Firm* — Duane S. Kobayashi

(57) ABSTRACT

Aspects of a method and system for implementing energy efficient Ethernet techniques in a MACSec enabled PHY are provided. In this regard, an Ethernet PHY comprising memory may be operable to perform packet processing functions comprising MACSec protocol processing and energy efficient Ethernet (EEE) processing. In this regard, the memory may be utilized for implementing the MACSec protocol processing and energy efficient Ethernet (EEE) processing. The Ethernet packet processing functions may comprise packet inspection, packet generation, and packet modification. The energy efficient Ethernet (EEE) processing may comprise generating and/or inspecting messages for controlling when to transition into and out-of an energy-saving mode. The Ethernet PHY may be operable to monitor signals and/or conditions within the Ethernet PHY and control transitions into and out-of an energy-saving mode based on the monitored signals and/or conditions. The energy saving mode may comprise a low power idle mode and/or a subset PHY mode.

20 Claims, 6 Drawing Sheets

(51) Int. Cl.
*H04L 1/00* (2006.01)
*H04L 12/26* (2006.01)
*G06F 15/173* (2006.01)
*G06F 1/00* (2006.01)
*H04L 29/06* (2006.01)
*H04L 12/10* (2006.01)

(56) References Cited

U.S. PATENT DOCUMENTS

| | | | |
|---|---|---|---|
| 7,814,329 B1* | 10/2010 | Hutchison et al. | 713/181 |
| 7,886,143 B2* | 2/2011 | Qi et al. | 713/153 |
| 8,275,261 B2* | 9/2012 | Mandin et al. | 398/72 |
| 8,416,687 B1* | 4/2013 | Hutchison | 370/230 |
| 2003/0165152 A1* | 9/2003 | Mills et al. | 370/422 |
| 2006/0034295 A1 | 2/2006 | Cherukuri et al. | |
| 2007/0280239 A1 | 12/2007 | Lund | |
| 2008/0130894 A1* | 6/2008 | Qj et al. | 380/277 |
| 2008/0225841 A1 | 9/2008 | Conway et al. | |
| 2009/0077394 A1* | 3/2009 | Tsai et al. | 713/310 |
| 2009/0080459 A1* | 3/2009 | Barkan et al. | 370/463 |
| 2009/0232151 A1* | 9/2009 | Furlong et al. | 370/419 |
| 2009/0249096 A1* | 10/2009 | Conner et al. | 713/320 |
| 2009/0262753 A1* | 10/2009 | On et al. | 370/466 |
| 2010/0049964 A1* | 2/2010 | Kondapalli et al. | 713/150 |
| 2010/0128738 A1* | 5/2010 | Barrass | 370/445 |
| 2010/0241880 A1 | 9/2010 | Wertheimer et al. | |
| 2010/0262848 A1 | 10/2010 | Bobrek et al. | |
| 2013/0142145 A1* | 6/2013 | Choi | 370/329 |

FOREIGN PATENT DOCUMENTS

| | | |
|---|---|---|
| EP | 1 494 407 | 1/2005 |
| GB | 2 337 672 | 11/1999 |
| WO | WO 00/31923 | 6/2000 |

OTHER PUBLICATIONS

Grow, "802.1 and Energy Efficient Ethernet." Sep. 11, 2007, pp. 1-6, XP002509616.

Bennett et al., "Energy Efficient Ethernet." Jul. 16, 2007, pp. 1-70, XP002509615.

* cited by examiner

METHOD AND SYSTEM FOR IMPLEMENTING ENERGY EFFICIENT ETHERNET TECHNIQUES IN A MACSEC ENABLED PHY

CROSS-REFERENCE TO RELATED APPLICATIONS/INCORPORATION BY REFERENCE

This patent application makes reference to, claims priority to and claims benefit from U.S. Provisional Patent Application Ser. No. 61/157,450 filed on Mar. 4, 2009.

The above stated application is hereby incorporated herein by reference in its entirety.

FIELD OF THE INVENTION

Certain embodiments of the invention relate to networking. More specifically, certain embodiments of the invention relate to a method and system for implementing energy efficient Ethernet techniques in a MACSec enabled PHY.

BACKGROUND OF THE INVENTION

Communications networks and in particular Ethernet networks, are becoming an increasingly popular means of exchanging data of various types and sizes for a variety of applications. In this regard, Ethernet networks are increasingly being utilized to carry voice, data, and multimedia traffic. Accordingly more and more devices are being equipped to interface to Ethernet networks. Broadband connectivity including internet, cable, phone and VOIP offered by service providers has led to increased traffic and more recently, migration to Ethernet networking. Much of the demand for Ethernet connectivity is driven by a shift to electronic lifestyles involving desktop computers, laptop computers, and various handheld devices such as smart phones and PDA's. Applications such as search engines, reservation systems and video on demand that may be offered at all hours of a day and seven days a week, have become increasingly popular.

These recent developments have led to increased demand on datacenters, aggregation, high performance computing (HPC) and core networking. As the number of devices connected to data networks increases and higher data rates are required, there is a growing need for new transmission technologies which enable higher data rates. Conventionally, however, increased data rates often results in significant increases in power consumption. In this regard, as an increasing number of portable and/or handheld devices are enabled for Ethernet communications, battery life may be a concern when communicating over Ethernet networks. Accordingly, ways of reducing power consumption when communicating over Ethernet networks may be needed.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for implementing energy efficient Ethernet techniques in a MACSec enabled PHY, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for implementing energy efficient Ethernet techniques in a MACSec enabled PHY. In various embodiments of the invention, an Ethernet PHY comprising memory may be operable to perform packet processing functions comprising MACSec protocol processing and energy efficient Ethernet (EEE) processing. In this regard, the memory may be utilized for implementing the MACSec protocol processing and energy efficient Ethernet (EEE) processing. The Ethernet packet processing functions may comprise packet inspection, packet generation, and packet modification. The energy efficient Ethernet (EEE) processing may comprise generating and/or inspecting messages for controlling when to transition into and out-of an energy-saving mode. The Ethernet PHY may be operable to allocate resources between the MACSec protocol processing and the energy efficient Ethernet (EEE) processing, and the allocation may be based on a prioritization of the various packet processing functions. For example, the Ethernet PHY may be operable to allocate a portion of the memory for the MACSec protocol processing prior to allocating a remaining portion of said memory for the energy efficient Ethernet (EEE) processing. Conversely, the Ethernet PHY may be operable to allocate a portion of the memory for the energy efficient Ethernet (EEE) processing prior to allocating a remaining portion of the memory for said MACSec protocol processing. The Ethernet PHY may be operable to monitor signals and/or conditions within the Ethernet PHY and control transitions into and out-of an energy-saving mode based on the monitored signals and/or conditions. The energy saving mode may comprise a low power idle mode and/or a subset PHY mode.

Figure 1A:
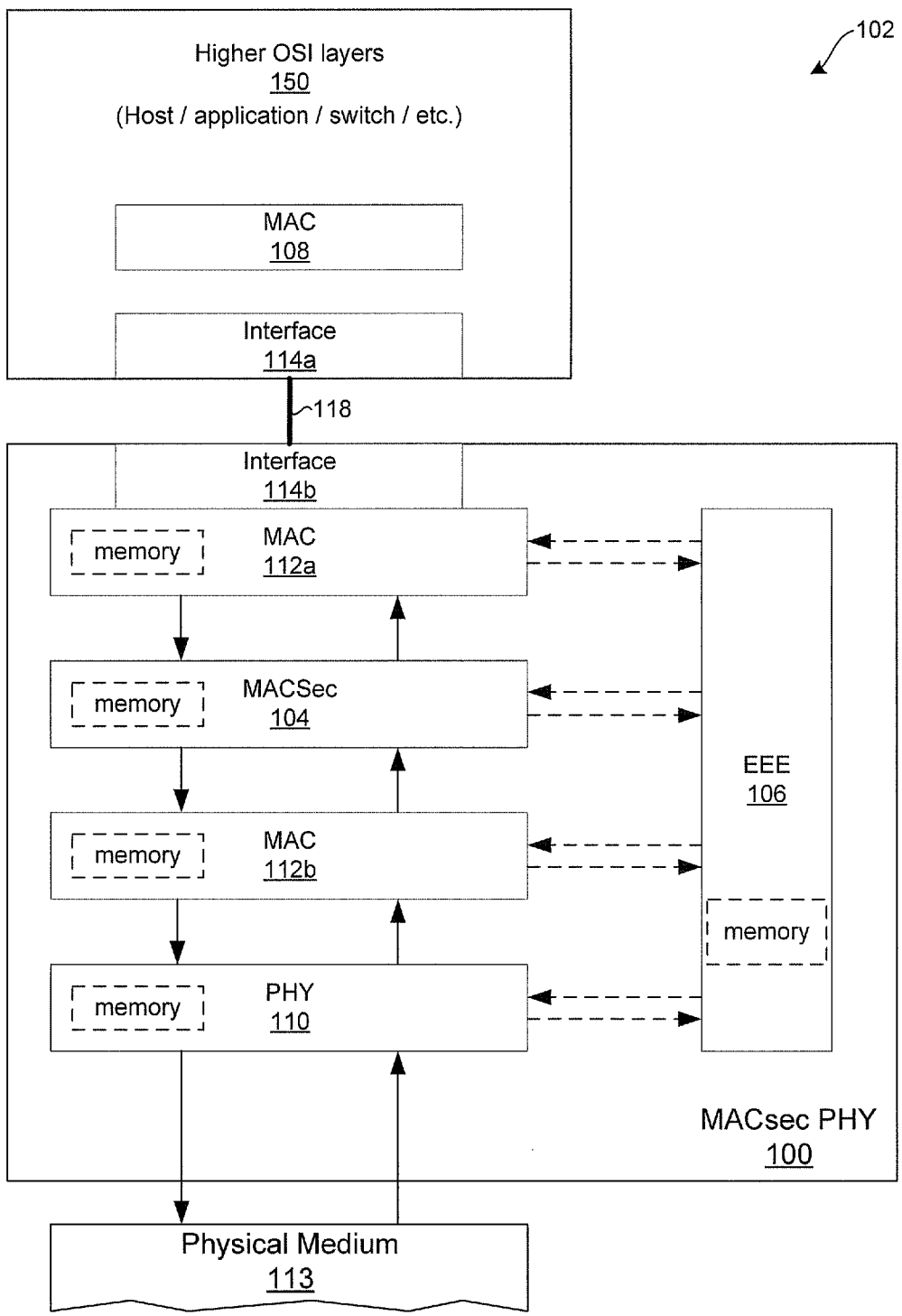
FIG. 1A is a functional block diagram a portion of a MACSec enabled network device comprising a MACSec PHY operable to implement energy efficient Ethernet techniques, in accordance with an embodiment of the invention.

FIG. 1A is a functional block diagram a portion of a MACSec enabled network device comprising a MACSec PHY operable to implement energy efficient Ethernet techniques, in accordance with an embodiment of the invention. Referring to FIG. 1A there is shown a network device 102 comprising a MACSec PHY 100 and higher OSI layer functions and/or modules represented as block 150. The MACSec PHY 100 comprises an interface 114b, a MAC 112a, a MACSec module 104, a MAC 112b, a PHY 110, and an EEE module 106. The MACSec PHY 100 is communicatively coupled to higher OSI layer functions and/or modules, represented by the logical and/or functional block 150, via the interfaces 114a and 114b.

The block 150 may implement functions of, for example, a network switch, router, personal computer, or mobile device. The block 150 may be operable to implement OSI layer 2 and possibly higher OSI layer protocols and/or functions. For example, the block 150 may be operable to generate timestamps in accordance with protocols such as IEEE 1588 and AVB. The block 150 may comprise a MAC 108 which may comprise suitable logic, circuitry, interfaces, and/or code operable to enable multiple application and/or services in the block 150 to communicate via the MACSec PHY 100. Accordingly, in various embodiments of the invention, the combination of the MACSec PHY 100 and the block 150 may comprise, for example, a switch, a router, a server, or a network controller. In this regard, the block 150 and the MACSec PHY 100 may be integrated in a common housing, on a shared printed circuit board, and/or on a in a system on chip.

The MACSec PHY 100 may comprise a twisted pair PHY capable of operating at one or more standard rates such as 10 Mbps, 100 Mbps, 1 Gbps, and 10 Gbps (10BASE-T, 100GBASE-TX, 1GBASE-T, and/or 10GBASE-T); potentially standardized rates such as 40 Gbps and 100 Gbps; and/or non-standard rates such as 2.5 Gbps and 5 Gbps. The MACSec PHY 100 may comprise a backplane PHY capable of operating at one or more standard rates such as 10 Gbps (10GBASE-KX4 and/or 10GBASE-KR); and/or non-standard rates such as 2.5 Gbps and 5 Gbps. The MACSec PHY 100 may comprise an optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY. The MACSec PHY 100 may support multi-lane topologies such as 40 Gbps CR4, ER4, KR4; 100 Gbps CR10, SR10 and/or 10 Gbps LX4 and CX4. Also, serial electrical and copper single channel technologies such as KX, KR, SR, LR, LRM, SX, LX, CX, BX10, LX10 may be supported. Non standard speeds and non-standard technologies, for example, single channel, two channel or four channels may also be supported. More over, TDM technologies such as PON at various speeds may be supported by the MACSec PHY 100.

The MACSec PHY 100 may comprise pluggable modules. In this regard, the pluggable module may be a removable or replaceable component within a network communication device. In this regard, the MACSec PHY 100 may have a standard form factor such as SFP, SFP+, XENPAK, X2, XFP and XPAK modules, or the MACSec PHY 100 may be a daughter card or pluggable module of a non-standard form factor. In various embodiments of the invention, the MACSec PHY 100 may be hot swappable—i.e., replaced without shutting down the entire network device.

The MACSec PHY 100 may be operable to support transmission and/or reception at a high(er) data in one direction and transmission and/or reception at a low(er) data rate in the other direction. For example, the network device 102 may comprise a multimedia server and a link partner may comprise a multimedia client. In this regard, the network device 102 may transmit multimedia data, for example, to the link partner at high(er) data rates while the link partner may transmit control or auxiliary data associated with the multimedia content at low(er) data rates. The network device 102 may also support wireless protocols such as the IEEE 802.11 family of standards.

In various embodiments of the invention, the MACSec PHY 100 may be operable to utilize one or more energy efficient Ethernet (EEE) techniques. For example, the MACSec PHY 100 may be operable to support low power idle (LPI) and/or subset PHY, also referred to as sub-rating, techniques. LPI may generally refer a family of techniques where, instead of transmitting conventional IDLE symbols during periods of inactivity, the MACSec PHY 100 may remain silent and/or communicate signals other than conventional IDLE symbols. Subset PHY may generally refer to a family of techniques where a data rate at which the PHY communicates is controlled based on a variety of factors such as current traffic load, predicted traffic load, and traffic type. Thus, the MACSec PHY 100 may be configurable to operate in a normal mode or in one of a plurality of an energy saving modes, where the energy saving modes may correspond to, for example, a low power idle (LPI) mode and/or one or more subset PHY modes where the MACSec PHY 100 may communicate at less than a maximum supported or initially negotiated data rate. The MACSec PHY 100 may be operable to implement OSI layer 2 and possibly higher OSI layer protocols and/or functions. For example, the MACSec PHY 100 may be operable to generate timestamps and/or otherwise implement protocols such as IEEE 1588 and audio video bridging (e.g. IEEE 802.1AS, IEEE 802.1Qat, IEEE 802.1Qav).

Implementation of the EEE technique(s) may be controlled based on an EEE control policy. The EEE control policy may be utilized to determine how and/or when to configure and/or reconfigure the MACSec PHY 100 to optimize the tradeoff between energy efficiency and performance. For LPI, the EEE control policy may be utilized determine what variant of LPI to utilize, when to go into a LPI mode and when to come out of a LPI mode. In this regard, variations of LPI may comprise, for example, different time intervals between IDLE signals, different signals sent instead of conventional IDLE signals, different criteria for transitioning into and/or out of an LPI mode. For subset PHY, EEE control policy may be utilized to determine, for example, how to achieve a desired data rate and when to transition between data rates. Although aspects of the invention are described with regard to LPI and subset PHY, the invention is not so limited and other EEN techniques may be implemented via an EEE control policy implemented in a MACSec PHY.

In some embodiments of the invention, the EEE control policy may be implemented in the MACSec PHY 100 and may be transparent to the block 150. In this manner, a MACSec PHY 100 that implements the EEE control policy may be compatible with the block 150 in instances that the block 150 comprises legacy, or non-EEE enabled, components. Consequently, implementing an EEE control policy in a MACSec PHY 100 may enable reaping the benefits of a more energy efficient network while avoiding the need to redesign or "re-spin" the MAC 108 or other components of the block 150. Additionally, in instances that the block 150 supports and/or implements one or more EEE techniques or control policies, the MACSec PHY 100 may supplement the EEE techniques and/or control policies implemented in the block 150.

Accordingly, the EEE module 106 may comprise suitable logic, circuitry, and/or code that may be operable to implement the EEE control policy and control configuration of the MACSec PHY 100 to optimize power consumption versus performance of the MACSec PHY 100. Although the EEE module 106 is shown as separate from the other components and/or functions of the MACSec PHY 100, the invention is not so limited and logic, circuitry, interfaces, and/or code may be shared between performing conventional functions of a MACSec PHY and performing functions for implementing an EEE control policy. For example, in various embodiments of the invention, the EEE module 106 may be integrated in and/or implemented by the PHY 110. In this regard, the PHY 110 may be operable to monitor signals and/or conditions within the MACSec PHY 100 and/or signals from the block 150 to make determinations as to when and how to transition between modes of operation, where one or more of those modes may be energy-saving modes. Accordingly, the PHY 110 may be reconfigurable to implement the EEE techniques and/or may be operable to generate one or more signals for configuring itself and/or other portions of the MACSec PHY 100. In some embodiments of the invention, implementation of EEE techniques and/or an associated control policy in the PHY 100 may enable bypassing one or more of the MACs 112a and 112b and the MACSec module 104, when MACSec protocols are not in use. In one exemplary embodiment of the invention, memory within the MACSec module 104 may be utilized by the PHY 100 to implement the EEE techniques and/or associated control policy, while other portions of the MACSec module 104 are bypassed and may be disabled and/or powered down.

The MACs 112a and 112b may comprise suitable logic, circuitry, interfaces, and/or code that may be operable to performing addressing and channel access control to enable several clients, services, or applications to communicate via the physical medium 113.

The MACSec module 104 may comprise suitable logic, circuitry, interfaces, and/or code operable to implement MACSec protocols comprising IEEE 802.1ae, IEEE 802.1af, and IEEE 802.1ar. In this regard, the MACSec module 104 may be operable to encrypt and decrypt data of an Ethernet frame, insert and/or parse a MACSec header (SecTAG) between the source MAC address and the encrypted data, and append and/or parse an integrity check value (ICV) after the encrypted data.

The PHY 110 may comprise suitable logic, circuitry, interfaces, and/or code that may be operable to convert digital information to physical signals impressed on the physical medium and convert physical signals received via the physical medium 133 into digital information. In some embodiments of the invention, as noted above, the PHY 110 may be operable to implement EEE techniques and/or an associated control policy.

The PHY 110 may comprise a twisted pair PHY capable of operating at one or more standard rates such as 10 Mbps, 100 Mbps, 1 Gbps, and 10 Gbps (10BASE-T, 100GBASE-TX, 1GBASE-T, and/or 10GBASE-T); potentially standardized rates such as 40 Gbps and 100 Gbps; and/or non-standard rates such as 2.5 Gbps and 5 Gbps. The PHY 110 may comprise a backplane PHY capable of operating at one or more standard rates such as 10 Gbps (10GBASE-KX4 and/or 10GBASE-KR); and/or non-standard rates such as 2.5 Gbps and 5 Gbps. The PHY 110 may comprise an optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY. The PHY 110 may support multi-lane topologies such as 40 Gbps CR4, ER4, KR4; 100 Gbps CR10, SR10 and/or 10 Gbps LX4 and CX4. Also, serial electrical and copper single channel technologies such as KX, KR, SR, LR, LRM, SX, LX, CX, BX10, LX10 may be supported. Non standard speeds and non-standard technologies, for example, single channel, two channel or four channels may also be supported. Moreover, TDM technologies such as PON at various speeds may be supported by the PHY 110.

Memory in the MACSec PHY 100 may enable storage or programming of information that includes parameters and/or code that may effectuate the operation of the MACSec PHY 100. In this regard, the memory may, for example, comprise one or more registers which may be accessed and/or controlled via a MDIO portion of the interface 114b. Additionally, the memory may buffer data received via the interface 114b prior to converting the data to physical symbols and transmitting it via the physical medium 113. For example, data from the interface 114b may be buffered while the MACSec PHY 100 transitions from an energy saving mode to a higher performance mode—transitioning out of LPI mode or from a sub-rate to a higher data rate, for example. Also, the memory may buffer data received via the physical medium 113 prior to packetizing or otherwise processing the data and conveying it to the MAC 108 via the interface 114b. For example, data received via the physical medium 113 may be buffered in the memory while higher layer functions and/or circuitry, such as the MAC 108 or PCI bus, exits an energy saving mode. In an exemplary embodiment of the invention, the MACSec module 104 may comprise a substantial amount of memory relative to the other components of the MACSec PHY 100 and thus may enable the implementation of advance EEE techniques that require such amounts of memory.

The memory in the MACSec PHY 100 may also store EEE parameters associated with implementing EEE techniques and/or an associated EEE control policy. The parameters may be exchanged utilizing one or more protocols such as logical link discovery protocol (LLDP) operating at OSI layer and/or other protocols operating at OSI layer 2 or higher OSI layers. In this regard, the EEE parameters may comprise for example, a parameter that indicates EEN techniques, such as LPI and subset PHY, that are supported; a parameter that indicates subset PHY data rates supported; one or more parameters that indicate an amount of time required for a network device to transition into one or more energy saving modes; one or more parameters that indicate an amount of time required for a network device to transition out of one or more energy saving modes; a networking parameter that indicates whether a network device is operating in an energy saving mode; one or more networking parameters for jittering time intervals at which data is communicated over an idle channel or during inter packet gap; and a parameter that indicates whether an EEN transition or other event is scheduled to occur.

The interfaces 114a and 114b comprise suitable logic, circuitry, and/or code operable to transmit and/or receive one or more data signals and one or more clock signals over the bus 118. The interface 114b may comprise, for example, a media independent interface such as SGMII for communicating data to and from the MACSec PHY 100. In this regard, the interface 114b may comprise a signal to indicate that data from the block 150 to the MACSec PHY 100 is imminent on the interface 114b. Such a signal is referred to herein as a transmit enable (TX_EN) signal. Similarly, the interface 114b may comprise a signal to indicate that data from the MACSec PHY 100 to the MAC 108 is imminent on the interface 114b. Such a signal is referred to herein as a receive data valid (RX_DV) signal. The interface 114 may also comprise a control interface such as a management data input/output (MDIO) interface.

In operation, the MACSec PHY 100 may be configured and/or reconfigured to optimize power consumption versus performance, where performance may be measured by, for example, latency introduced by the MACSec PHY 100. In this regard, the EEE module 106 may be operable to monitor one or more conditions and/or signals in the MACSec PHY 100 and control a mode of operation of the MACSec PHY 100 based on the monitoring. In this regard, the EEE module 106 may receive and/or monitor one or more signals from one or more of the interface 114b, the MAC 112a, the MACSec module 104, the MAC 112b, and the PHY 110. The module 106 may utilize the EEE control policy to make configuration decisions based on the monitored signals and/or conditions. Also, the EEE module 106 may generate one or more control signals, based on the decisions made utilizing the EEE control policy, to configure and reconfigure the interface 114b, the MAC 112a, the MACSec module 104, the MAC 112b, and the PHY 110.

Furthermore, the EEE module 106 may utilize resources in one or more of the interface 114b, the MAC 112a, the MACSec module 104, the MAC 112b, and/or the PHY 110 for implementing an EEE control policy. For example, one or more of the MAC 112a, the MACSec module 104, the MAC 112b, and the PHY 110 may comprise memory that may be utilized for buffering data during certain modes of operation and/or during transitions between modes of operation. In an exemplary embodiment of the invention, the MACSec module 104 may comprise a substantial amount of memory relative to the other components of the MACSec PHY 100 and thus may enable the implementation of advance EEE techniques that require such amounts of memory.

Figure 1B:
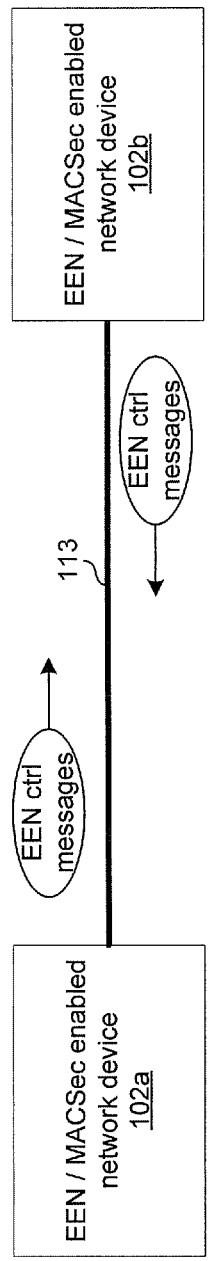
FIG. 1B is a block diagram illustrating communication between network devices operable to implement MACSec and energy efficient Ethernet (EEE) techniques, in accordance with an embodiment of the invention.

FIG. 1B is a block diagram illustrating communication between network devices operable to implement MACSec and EEE techniques, in accordance with an embodiment of the invention. Referring to FIG. 1B, there is link partners 102a and 102b which may be substantially similar to, or the same as, the network device 102 described with respect to FIG. 1A.

In operation, the link partners 102a and 102b may communicate over the physical medium 113. In this regard, packets communicated between the link partners 102a and 102 may be secured utilizing MACSec. Additionally, the link partners 102a and 102b may each be operable to implement EEE techniques such as LPI and/or subset PHY. Accordingly, the link partners 102a and 102b may exchange EEE control messages such that transitions into and out-of energy-saving modes of operation may be communicated between the link partners. Additionally, each link partner 102a and 102b may be operable to communicate parameters, conditions, or other EEE related information to the other link partner via the EEE control messages.

Figure 2:
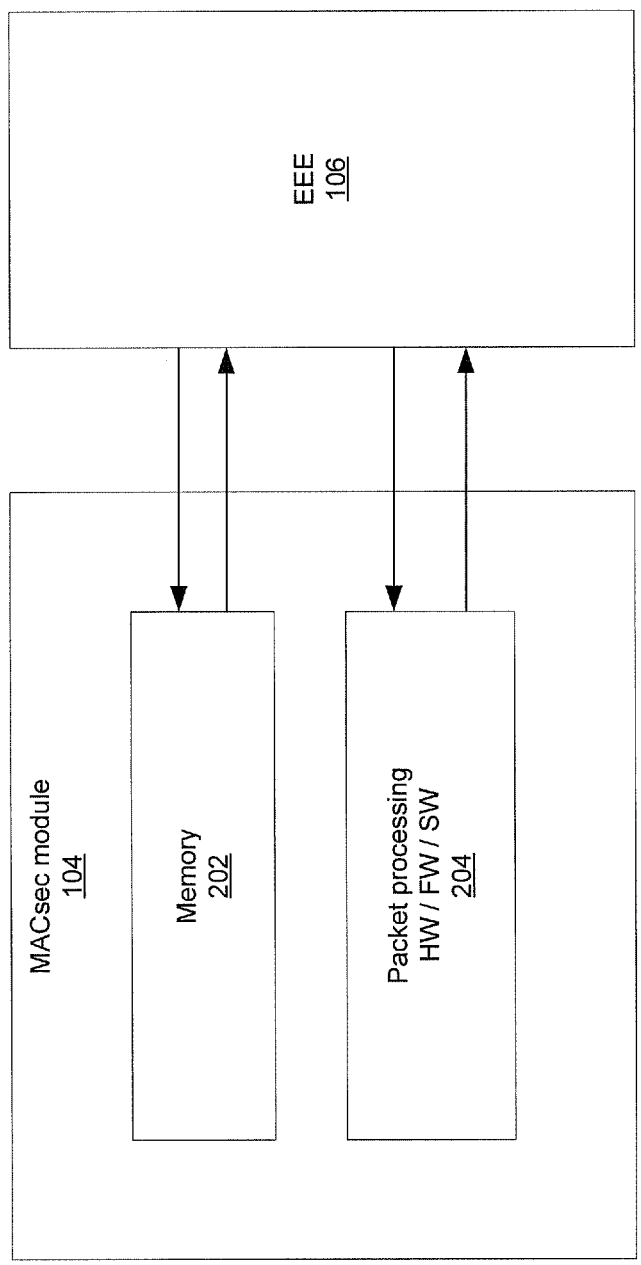
FIG. 2 is a functional block diagram illustrating a portion of an EEE enabled MACSec PHY, in accordance with an embodiment of the invention.

FIG. 2 is a functional block diagram illustrating a portion of an EEE enabled MACSec PHY, in accordance with an embodiment of the invention. Referring to FIG. 2 there is shown details of an exemplary MACSec module 104. The MACSec module 104 may comprise memory 202 and a packet processing engine 204.

The memory 202 may be operable to store data, which may be utilized for implementing one or more security protocols. In this regard, the data may be stored in the memory to support encryption and/or decryption. Additionally, the memory 202 may be operable to buffer data to support one or more EEE techniques such as LPI or subset PHY. In this regard, the memory may be allocated based on a variety of factors such as security protocols in use, EEE techniques in use, types and/or amounts of traffic being communicated, resources and/or capabilities of a link partner, a data rate at which data is communicated over a physical link, and a state or mode of operation of higher layer components such as a MAC or PCI bus.

The packet processing engine 204 may comprise suitable logic, circuitry, interfaces, and/or code that may be operable to provide layer 2, or partial layer 2, functionality within the MACSec PHY 100. In this regard, the packet processing engine 204 may be operable to parse and/or inspect packets, generate packets, and/or modify packets. Accordingly, the packet processing engine 204 may be operable to recognize packets, and/or portions thereof, based on information in headers and/or a payload of the packets. In this regard, the packet processing engine 204 may be operable to generate packets to be transmitted and process received packets for communicating states, conditions, and/or EEE decisions to a link partner.

In operation, the memory 202 and packet processing engine 204 may enable the MACSec PHY 100 to implement advanced EEE control policies that a non-MACSec PHY would not have the necessary resources to implement. For example, the memory 202 and packet processing engine 204 may enable the MACSec PHY 100 to generate, send, receive, and process more complex EEE messages than could be communicated by an EEE protocol implemented in a non-MACSec PHY. In this manner, packet inspection, generation, and/or modification capabilities of the MACSec PHY 100 may be enable exchanging EEE messages that may be utilized to make decisions about when and/or how to configure or reconfigure the MACSec PHY 100 to optimize the trade-off between energy consumption and performance. In this regard, the messages may comprise information such as what modes of operation are supported by the MACSec PHY 100, how long the MACSec PHY 100 and/or a link partner require to transition between the various modes, and how much buffering the MACSec PHY 100 and/or the link partner are operable to allocate for buffering data during transitions between modes of operation.

In various embodiments of the invention, the MACSec PHY 100 may be operable to negotiate transmit and/or receive buffer sizes with a link partner and, based on such negotiation, allocate buffers and/or memory in the MACSec module 104 accordingly. In this regard, transitioning into and out-of an energy-saving mode may require agreement by the link partner, or at least awareness of what the link partner is doing. For example, in instances that the link partner takes longer to wake up than the MACSec PHY 100, the MACSec PHY 100 may allocate memory in the MACSec module 104 for transmit buffering. Conversely, in instances that the link partner wakes up faster than the MACsec PHY 100, the MACsec PHY 100 may allocate memory 202 for receive buffering and/or request that the link partner increase its transmit buffer size and/or delay transmission.

Accordingly, in some embodiments of the invention, the EEE control policy implemented in the MACSec PHY 100 may be operable to dynamically allocate portions of the memory 202. For example, portions of the memory 202 may be allocated to supplement transmit and receive buffering. In this regard, the memory 202 may be shared between implementing MACSec protocols and implementing an EEE control policy. In instances that there is memory conflict, or insufficient memory 202 to support both EEE and MACSec simultaneously, the EEE control policy may give precedence to MACSec or may give precedence to EEE. In this regard, the whether MACSec or energy efficiency takes priority may be determined based on, for example, type of data being communicated, user preferences, applications generating and/or receiving the data, priority assigned via a tagging such as is utilized with audio video bridging protocols.

Figure 3A:
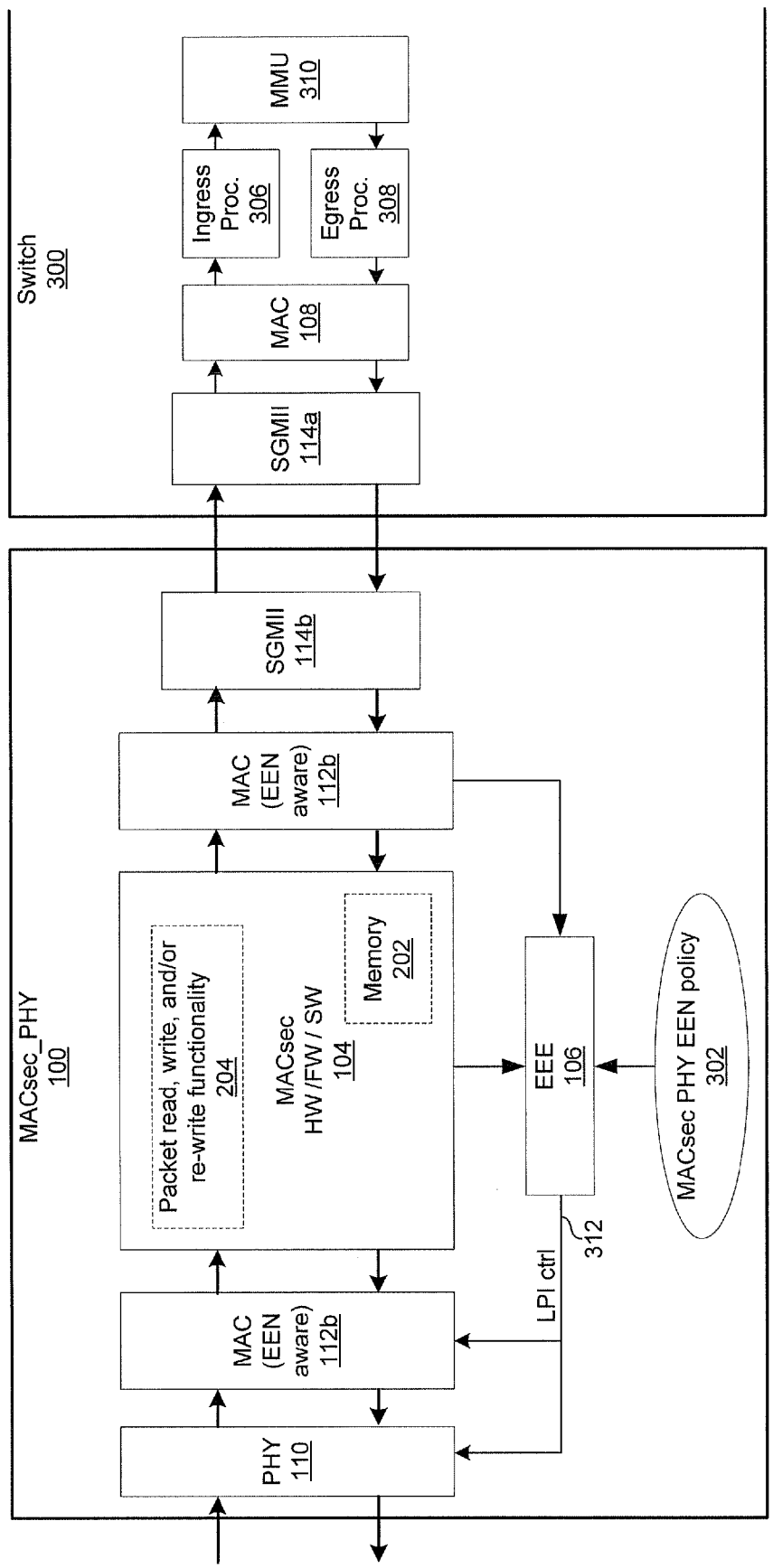
FIG. 3A is a bock diagram illustrating implementation of an EEE control policy in a MACSec enabled PHY coupled to a non-EEE capable switch, in accordance with an embodiment of the invention.

FIG. 3A is a functional bock diagram illustrating implementation of an EEE control policy in a MACSec enabled PHY coupled to a non-EEE capable switch, in accordance with an embodiment of the invention. Referring to FIG. 3, there is shown the MACSec PHY 100 which may be as described with respect to FIGS. 1A-2. FIG. 3 illustrates an exemplary embodiment of the invention where a EEE enabled MACSec PHY 100 is coupled to a non-EEE enabled device, the device in this instances being a switch. In this regard, implementation of EEE techniques by the MACSec PHY 100 may be transparent to the switch 300. In the exemplary embodiment of the invention depicted the MACSec PHY 100 may implement LPI and an EEE control policy for determining how and when to transition into and out-of LPI.

The switch 300 may be similar to the block 150 described with respect to FIG. 1A. The switch 300 comprises the interface 114b and the MAC 108 described with respect to FIG. 1. In this regard, the interfaces 114a and 114b may be, for example, SGMII. Additionally, the switch 300 comprises an ingress data processing path 306, an egress data processing path 308, and a memory management unit 310.

The ingress processing path 306 may comprise suitable logic, circuitry, interfaces, and/or code that may be operable to process data received via the MACSec PHY 100. The egress processing path 308 may comprise suitable logic, circuitry, interfaces, and/or code that may be operable to process data received via the MACSec PHY 100. The memory management unit (MMU) 310 may comprise suitable logic, circuitry, interfaces, and/or code that may be operable to manage transmit and/or receive buffers in the switch 300. In this regard, the MMU 310 may set, monitor, and adjust capacity, usage, and/or thresholds of buffers. The MMU 310 may also be operable to control allocation of memory to one or more transmit and/or receive buffers.

In operation, the MACSec PHY 100 may implement an EEE control policy to control transitions into and out of an LPI mode. In this regard, conditions within and/or signals generated by the MAC 112b and/or conditions within and/or generated by the MACSec module 104 may be monitored. In this regard, the MACsec module 104 may generate one or more signals based on EEE control messages exchanged with a link partner. Based on the monitored signals and/or conditions, and based on the EEE control policy 302, decisions may be made regarding when to transition into and out of LPI. Signals 312 may be generated to based on the decisions and one or more portions of the MACSec PHY 100, such as the MAC 112b and/or the PHY 110, may be configured accordingly.

Figure 3B:
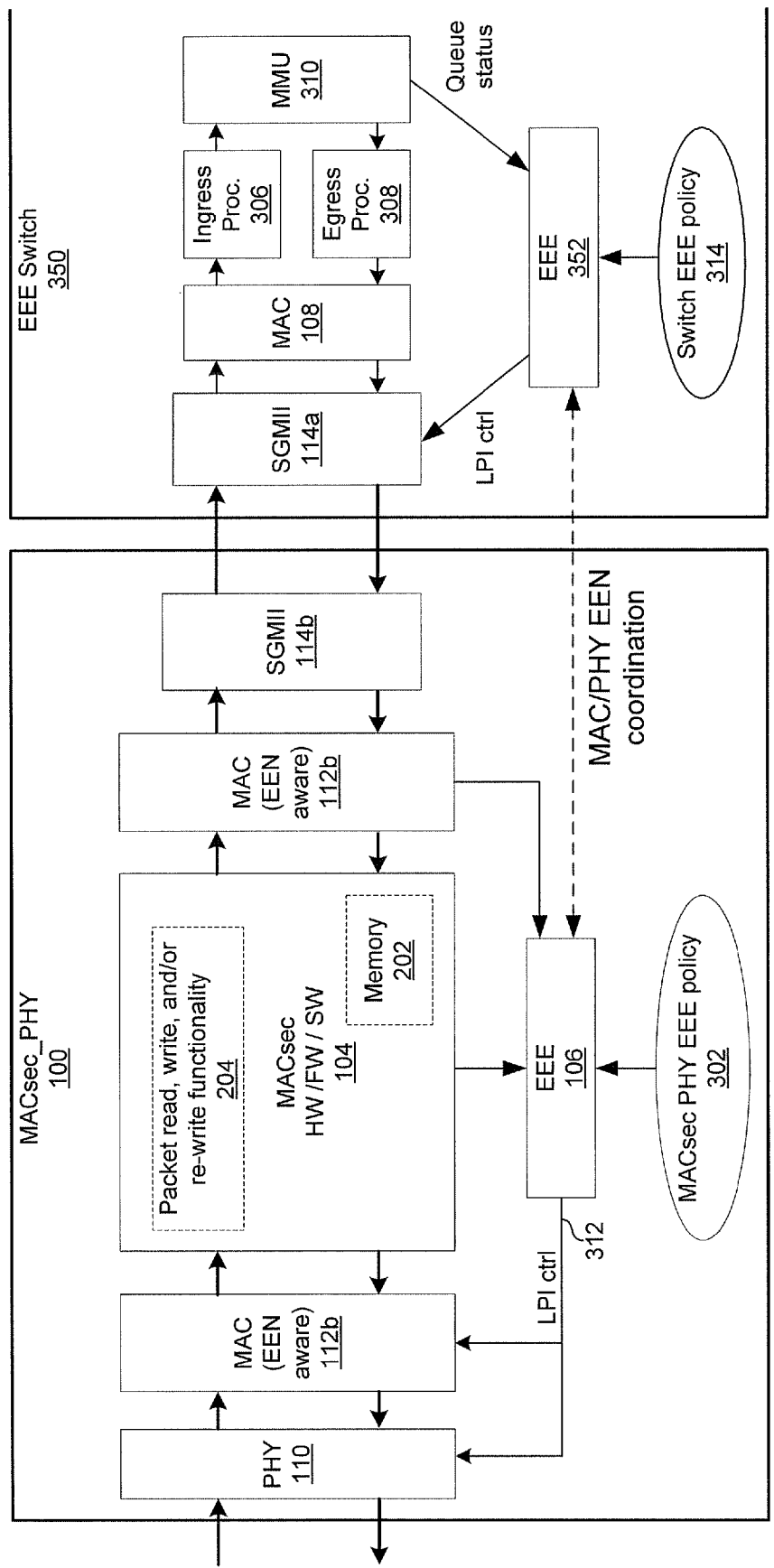
FIG. 3B is a functional bock diagram illustrating implementation of an EEE control policy in a MACSec enabled PHY coupled to a EEE capable switch, in accordance with an embodiment of the invention.

FIG. 3B is a functional bock diagram illustrating implementation of an EEE control policy in a MACSec enabled PHY coupled to a EEE capable switch, in accordance with an embodiment of the invention. Referring to FIG. 3B, there is shown the MACSec PHY 100 and an EEE enabled switch 350. The MACSec PHY 100 may be as previously described in FIGS. 1A, 2, and 3. The switch 350 may be similar to the switch 300, but may differ in that it is operable to implement LPI and a corresponding EEE control policy for controlling transitions into and out-of LPI. The EEE control policy in the MACSec PHY 100 may supplement the EEE control policy in the switch 350. In various embodiments of the invention, the EEE control policy implemented in the MACSec PHY 100 may be independent of the EEE control policy implemented on the switch 350 or the two control policies may share signals and/or information to increase energy efficiency.

The switch 350 may comprise suitable logic, circuitry, interfaces, and/or code, represented as module 352, for implementing EEE techniques—LPI, for example. The module 352 may be similar to the EEE module 106 described with respect to FIG. 1A and 1B. In this regard, although the module 352 is represented as a separate block, the functionality of the module 352 may be performed by shared hardware and/or by software.

In operation, the switch 350 may make decision for implementing LPI based on signals from the MMU 310, based on the EEE control policy 314, and also based on information exchanged with the EEE module 106 in the MACSec PHY 100. In this manner, the EEE modules 106 and 352 may exchange information in order to coordinate the EEE decisions to optimize energy efficiency vs. performance of the MACSec PHY 100 and the switch 350.

Figure 4:
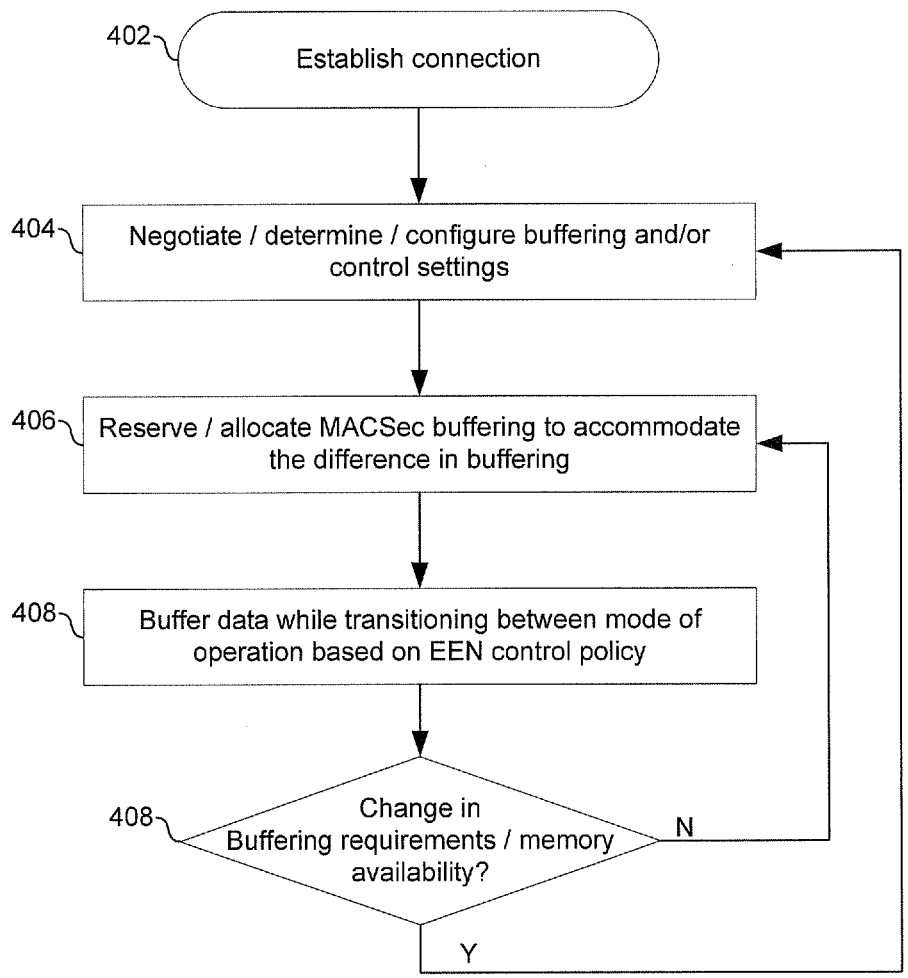
FIG. 4 is a flow chart illustrating exemplary steps for implementing EEE protocols in a MACSec enabled PHY, in accordance with an embodiment of the invention.

FIG. 4 is a flow chart illustrating exemplary steps for implementing EEE protocols in a MACSec enabled PHY, in accordance with an embodiment of the invention. Referring to FIG. 4, the exemplary steps may begin with step 402 in which a EEE enabled MACSec PHY may establish a connection to a link partner, which may or may not be MACSec enabled and may or may not be EEE enabled. Subsequent to step 402, the exemplary steps may advance to step 404.

In step 404, the MACSec PHY and the link partner may determine each other's buffering capabilities, negotiate allocation of memory to buffering, and/or the MACSec PHY may configure the buffering in the link partner or visa versa. In a MACSec enabled PHY, the determination and/or negotiation may be performed utilizing packet inspection, generation, and/or modification capabilities within the MACSec PHY. The negotiation may take into account whether or not the link partner is MACSec and/or EEE enabled. If the link partner is EEE enabled, the buffering capacity may be negotiated based on how long each of the MACSec PHY and the link partner requires to transition between modes or operation. In addition to buffering capabilities and/or capacity, the MACSec PHY may determine, negotiate, configure, and/or be configured with regards to other parameters and/or settings associated with implementing EEE, MACSec, or other protocols. Subsequent to step 404, the exemplary steps may advance to step 406.

In step 406, the MACSec PHY may allocate additional memory for transmit and/or receive buffering if the link partner was unable to allocate sufficient buffering to prevent lost or corrupted packets during times when the MACSec PHY is transitioning between modes of operation. In this regard, the additionally memory reserved for buffering may be in a MACSec module such as the MACSec module 104 described with respect to FIGS. 1 and 2. Subsequent to step 406, the exemplary steps may advance to step 408.

In step 408, the buffer space allocated in step 406 may be utilized to store received packets and/or to-be-transmitted packets while the MACSec PHY, and/or higher layer components of the first network device, and/or the link partner transition between modes of operation. Subsequent to step 408, the exemplary steps may advance to step 410.

In step, 410 it may be determined whether buffering requirements and/or memory availability of the MACSec PHY and/or the link partner have changed. In instances that the requirements and/or availability are not changed, the exemplary steps may return to the previously described step 406 and the devices may be configured, including reservation or resources, for the next transition into or out of an energy saving mode. In instances that the requirements and/or availability have changed, the exemplary steps may return to previously described step 404, In this manner, the allocation of resources may be dynamic and may adapt to changing conditions such as MACSec and/or EEE being enabled and/or disabled.

Aspects of a method and system for Implementing Energy Efficient Ethernet techniques in a MACSec Enabled PHY 100 are provided. In an exemplary embodiment of the invention, an Ethernet PHY 100 comprising memory 202 may be operable to perform packet processing functions comprising MACSec protocol processing and energy efficient Ethernet (EEE) processing. In this regard, the memory 202 may be utilized for implementing the MACSec protocol processing and energy efficient Ethernet (EEE) processing. The Ethernet packet processing functions may comprise packet inspection, packet generation, and packet modification. The energy efficient Ethernet (EEE) processing may comprise generating and/or inspecting messages for controlling when to transition into and out-of an energy-saving mode. The Ethernet PHY 100 may be operable to allocate resources between the MACSec protocol processing and the energy efficient Ethernet (EEE) processing, and the allocation may be based on a prioritization of the various packet processing functions. For example, the Ethernet PHY 100 may be operable to allocate a portion of the memory 202 for the MACSec protocol processing prior to allocating a remaining portion of the memory 202 for the energy efficient Ethernet (EEE) processing. Conversely, the Ethernet PHY 100 may be operable to allocate a portion of the memory 202 for the energy efficient Ethernet (EEE) processing prior to allocating a remaining portion of the memory for said MACSec protocol processing. The Ethernet PHY 100 may be operable to monitor signals and/or conditions within the Ethernet PHY 100 and control transitions into and out-of an energy-saving mode based on the monitored signals and/or conditions. The energy saving mode may comprise a low power idle mode and/or a subset PHY mode.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for implementing energy efficient Ethernet techniques in a MACSec enabled PHY.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
performing by one or more circuits in a first Ethernet physical layer device (PHY), wherein the first Ethernet PHY includes a MACSec module configured for communication with a second Ethernet PHY in a link partner using a MACSec protocol, the MACSec module including a memory:
receiving information from the second Ethernet PHY, the received information enabling the first Ethernet PHY to determine energy saving capabilities of the second Ethernet PHY; and
allocating, based on the determined energy saving capabilities of the second Ethernet PHY, a portion of the memory for buffering of one or more Ethernet packets that are awaiting communication onto the link concurrent with the first Ethernet PHY transitioning between a first data rate and a second data rate, at least one of the first data rate and the second data rate used in an energy saving mode of the first Ethernet PHY.

2. The method according to claim 1, further performing, by the one or more circuits, generating and/or inspecting, in the first Ethernet PHY, messages for controlling when the transitioning occurs.

3. The method according to claim 1, wherein the allocating comprises allocating a first portion of the memory for MACSec protocol processing and a second portion of the memory for energy efficient Ethernet (EEE) processing.

4. The method according to claim 3, wherein the first portion of the memory for MACSec protocol processing is allocated prior to the second portion of the memory for energy efficient Ethernet (EEE) processing.

5. The method according to claim 3, wherein the second portion of the memory for energy efficient Ethernet (EEE) processing is allocated prior to the first portion of the memory for MACSec protocol processing.

6. The method according to claim 1, wherein one of the first and second data rates is enabled by a low power idle mode.

7. The method according to claim 1, wherein one of the first and second data rates is enabled by a subset PHY mode.

8. The method according to claim 1, wherein the received information from the second Ethernet PHY enables the first Ethernet PHY to determine a length of time for the second Ethernet PHY to transition between the first data rate and the second data rate.

9. The method according to claim 1, wherein the received information from the second Ethernet PHY enables the first Ethernet PHY to determine an energy saving mode supported by the second Ethernet PHY.

10. The method according to claim 1, wherein the received information from the second Ethernet PHY enables the first Ethernet PHY to determine an amount of buffering that the second Ethernet PHY can allocate for transitions between the first data rate and the second data rate.

11. A device for networking, comprising:
one or more circuits for use in a first Ethernet physical layer device (PHY), wherein the first Ethernet PHY includes a MACSec module configured for communication with a second Ethernet PHY in a link partner using a MACSec protocol, the MACSec module including a memory, wherein the one or more circuits are operable to:
receive information from the second Ethernet PHY, the received information enabling the first Ethernet PHY to determine energy saving capabilities of the second Ethernet PHY; and
allocate, based on the determined energy saving capabilities of the second Ethernet PHY, a portion of the memory for buffering of one or more other Ethernet packets that are awaiting communication onto the link concurrent with the first Ethernet PHY transitioning between a first data rate and a second data rate, at least one of the first data rate and the second data rate used in an energy saving mode of the first Ethernet PHY.

12. The device according to claim 11, wherein the one or more circuits are further operable to generate and/or inspect, in the first Ethernet PHY, messages for controlling when the transitioning occurs.

13. The device according to claim 11, wherein the one or more circuits are operable to allocate a first portion of the memory for MACSec protocol processing and a second portion of the memory for energy efficient Ethernet (EEE) processing.

14. The device according to claim 13, wherein the first portion of the memory for MACSec protocol processing is allocated prior to the second portion of the memory for energy efficient Ethernet (EEE) processing.

15. The device according to claim 13, wherein the second portion of the memory for energy efficient Ethernet (EEE) processing is allocated prior to the first portion of the memory for MACSec protocol processing.

16. The device according to claim 11, wherein one of the first and second data rates is enabled by a low power idle mode.

17. The device according to claim 11, wherein one of the first and second data rates is enabled by a subset PHY mode.

18. The device according to claim 11, wherein the received information from the second Ethernet PHY enables the first Ethernet PHY to determine a length of time for the second Ethernet PHY to transition between the first data rate and the second data rate.

19. The device according to claim 11, wherein the received information from the second Ethernet PHY enables the first Ethernet PHY to determine an energy saving mode supported by the second Ethernet PHY.

20. The device according to claim 11, wherein the received information from the second Ethernet PHY enables the first Ethernet PHY to determine an amount of buffering that the second Ethernet PHY can allocate for transitions between the first data rate and the second data rate.

* * * * *